Aug. 29, 1950   R. S. STONE   2,520,861
SLED CONSTRUCTION
Filed March 10, 1947

INVENTOR.
Robert S. Stone
BY
Haygood & Van Horn
ATTORNEYS.

Patented Aug. 29, 1950

2,520,861

UNITED STATES PATENT OFFICE 2,520,861

SLED CONSTRUCTION

Robert S. Stone, Cleveland, Ohio

Application March 10, 1947, Serial No. 733,542

4 Claims. (Cl. 287—86)

This invention relates to a sled or similar runner supported vehicle and to a joint which finds one useful application in such articles.

An object of the invention is to provide an improved sled which will steer easily.

Another object is to provide an improved sled which will be extremely strong and durable.

Another object is to provide an improved sled which will be light.

Another object is to provide an improved sled which will be composed of few and simple parts.

Another object is to provide an improved sled which may be easily produced.

Another object is to provide an improved sled which will present a minimum of resistance toward forward movement even when making turns.

Another object is to provide an improved sled which will be neat and attractive in appearance.

Another object is to provide an improved joint which will permit ready and easy flexure of an elongated article such as a sled runner.

Another object is to provide an improved joint which will present a smooth and continuous surface in any positon.

Another object is to provide an improved joint which will carry transverse loads.

Another object is to provide an improved joint which will be extremely durable.

Other objects will hereinafter appear.

The invention will be better understood from one practical embodiment thereof, illustrated in the accompanying drawings, in which.

Figure 1:
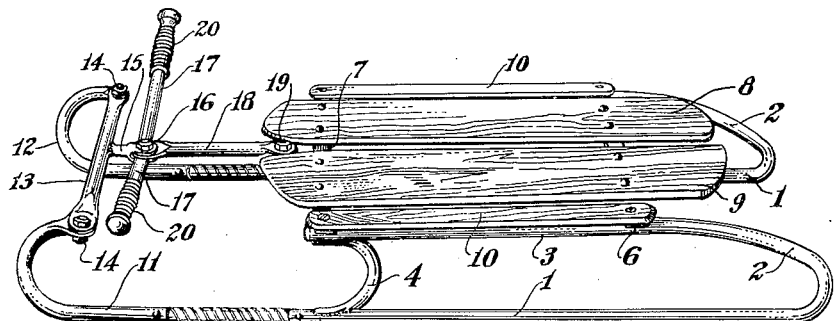
Figure 1 is a perspective view of a small sled embodying my invention.

The sled shown consists of two parallel runners, each comprising a rear part having straight horizontal bottom tubular portion 1, the rear end of which is bent upwardly as indicated at 2 and then forwardly as shown at 3 for connection to the carrying platform. The forward ends of the lower tubular portion 1 and the upper tubular portion 3 are connected by a semi-circular strut 4, which is shown as attached to these parts by welding 5.

Supported on the two upper tubular portions 3, upon transverse bars or beams 6 and 7, is the passenger carrying platform, shown as made of two relatively wide boards 8 and 9, and at the extreme ends of the bars 6 and 7 are fixed two grips or hand rails 10.

The runner portions 1 terminate at their forward ends at flexible joints which connect them with the two forward tubular runner portions 11 and 12, the lower portions of which are straight and normally axially in alignment with tubular portions 1, and the foremost ends of these forward runner parts are bowed upwardly and connected by a cross bar 13 pivoted by bolts 14 to the ends of the runner sections 11 and 12.

The cross bar 13 has secured to it a projecting lug 15, to which is pivoted, by a bolt 16, the intersecting portion of a steering unit consisting of laterally extending handle bars 17 and a rearwardly extending link 18, the latter being pivoted to cross bar 7 by a bolt 19.

The handle bars 17 and link 18 conveniently are made of metal tubing welded together, and the bars may be provided with rubber or similar grips 20.

Figure 3:
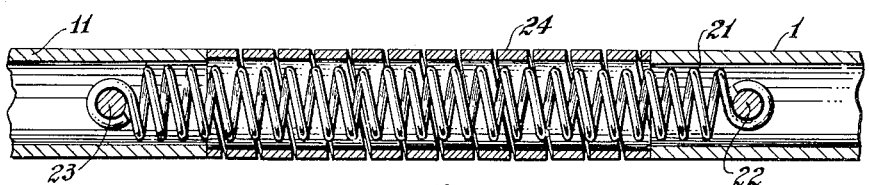
Figure 3 is a fragmentary central transverse sectional views of the joint and the runners of the sled taken on the line III—III of Figure 2.

The joints between the tubular runner sections 1, 11 and 12 are most clearly illustrated in Figure 3, which shows the two tubular sections on one side of the sled connected by a helical tension spring 21 secured to tubular section 1 by means of a horizontal transverse pin or rivet 22 and to forward runner part 12 by a similar pin or rivet 23.

This spring is of a diameter to fit loosely within the ends of the tubular runner members, and is surrounded by a helical compression spring 24, preferably made of flat stock with the convolutions wound very close together, the exterior of these convolutions presenting an almost unbroken continuation of the outer surface of tubes 1 and 11 (or 12).

The tension on spring 21 causes the ends of the tubular sections 1 and 11 (or 12) to press tightly upon the ends of spring 24, somewhat compressing the spring, and firmly locating it in place, and it will be appreciated that this holding of the outer spring 24 will be still more effective if the external diameter of spring 21 is very close to the internal diameter of spring 24.

The spaces between the convolutions of spring 24 are so narrow that no substantial amount of snow or dirt can penetrate into them, but the runner in passing over the snow will present to all practical intents a smooth cylindrical surface from the fore part of section 11 (or 12) to the rear of the runner part 1.

The cylindrical continuous surface of the runners and joints moreover distributes the weight of the sled and rider over the snow so that unit pressures are relatively low and the runners do not tend to dig in unless the snow be extremely soft.

Figure 2:
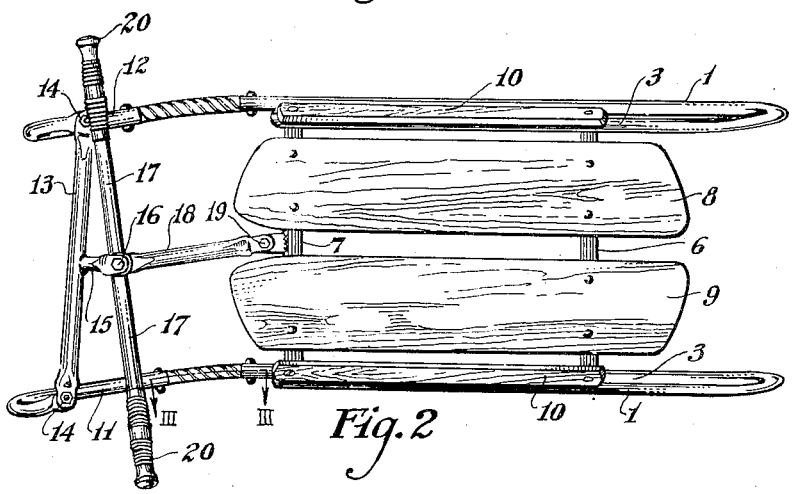
Figure 2 is a plan view of the sled of Figure 1.

When it is desired to steer the sled to either side, the handles 20 are swung in the direction the rider wishes to go, for example, to the left as shown in Figure 2 and this of course moves runner sections 11 and 12 to the left with relation to runner sections 1. The spring joints between the runner sections bend into smooth curves, as clearly shown in Figure 2, keeping the frictional resistance between the runners and the snow to a minimum, and preventing any substantial loss of speed.

When the rider releases pressure on the handles, the springs assist in returning the runner parts to straight ahead position.

The stiffness of the springs when held in this manner permits the flexible joint to carry a substantial part of the weight of the sled and rider without bowing upwardly to any noticeable degree, while the joint is sufficiently flexible that it may readily be bent for steering purposes, it being noted that the arrangement of the handle bars 17 and 18 is such as to apply a very large leverage in steering, due to the distance of the hand on grips 20 from the pivot bolt 19.

While I have described the illustrated embodiment of my invention in some particularity, obviously many other embodiments, variations, and modifications will readily occur to those skilled in this art, and I do not, therefore, limit myself to the precise details shown and described herein, but claim as my invention all embodiments, modifications and variations coming within the scope of the appended claims.

I claim:

1. A joint including two tubular members arranged substantially end to end, a tension spring extending into the adjacent ends of both members and fastened thereto, the adjacent ends being spaced apart, a flexible covering interposed between said ends of said members surrounding said tension spring and held under compression between said ends by the tension of said spring, the exterior of the flexible covering forming a substantial continuation of the surfaces of said tubular members.

2. A joint including two tubular members arranged substantially end to end with their ends spaced apart, a helical coil tension spring extending into the adjacent ends of both members and fastened thereto, a flexible covering interposed between the ends of the members surrounding the tension spring, the exterior of the covering forming a substantial continuation of the surfaces of said tubular members, the covering being maintained under compression by the tension of the helical spring.

3. A joint including two tubular members arranged substantially end to end with their ends spaced apart, a helical coil tension spring extending into the adjacent ends of both members and fastened thereto, a flexible helical coil the outer surface of the convolutions of which are flat, said coil being interposed between the ends of the members and surrounding the tension spring, the exterior of the outer helical coil forming a substantial continuation of the surfaces of said tubular members, the outer helical coil being maintained under compression by the tension of the helical spring.

4. A joint including two tubular members arranged substantially end to end with their ends spaced apart, a helical coil tension spring extending into the adjacent ends of both members and fastened thereto, a flexible helical coil each convolution of which is normally in contact with adjacent convolutions and the outer surface of the convolutions of which are flat, said coil being interposed between the ends of the members and surrounding the tension spring, the exterior of the outer helical coil forming a substantial continuation of the surfaces of said tubular members, the outer helical coil being maintained under compression by the tension of the helical spring.

ROBERT S. STONE.

REFERENCES CITED

The following references are of record in the file of this patent:

UNITED STATES PATENTS

| Number | Name | Date |
| --- | --- | --- |
| 1,204,582 | Manning et al. | Nov. 14, 1916 |
| 1,790,500 | Fischer | Jan. 27, 1931 |
| 2,134,197 | Miller | Oct. 25, 1938 |
| 2,183,638 | Bowen et al. | Dec. 19, 1939 |
| 2,222,146 | Jonsson | Nov. 19, 1940 |
| 2,305,703 | Smith | Dec. 22, 1942 |

FOREIGN PATENTS

| Number | Country | Date |
| --- | --- | --- |
| 5,133 | Great Britain | 1912 |
| 517,474 | France | May 6, 1921 |